May 16, 1939.  B. L. FLANAGAN  2,158,067
FASTENING DEVICE FOR BEEHIVES
Filed June 19, 1937  3 Sheets-Sheet 1
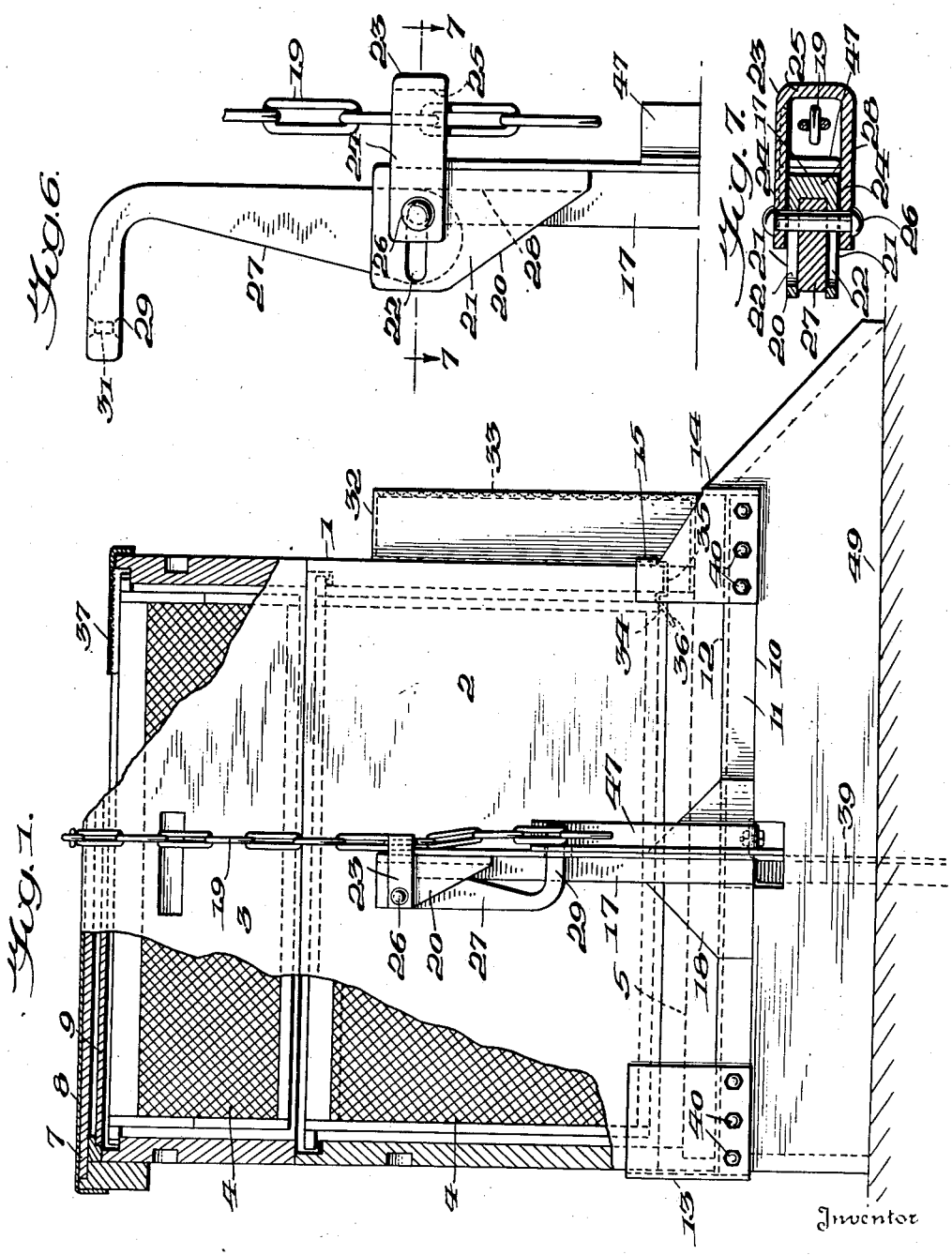
Inventor
Bernard L. Flanagan
By Ritter, Mechlin, O'Neill & Muir
his Attorneys May 16, 1939.　　　B. L. FLANAGAN　　　2,158,067
FASTENING DEVICE FOR BEEHIVES
Filed June 19, 1937　　　3 Sheets-Sheet 2
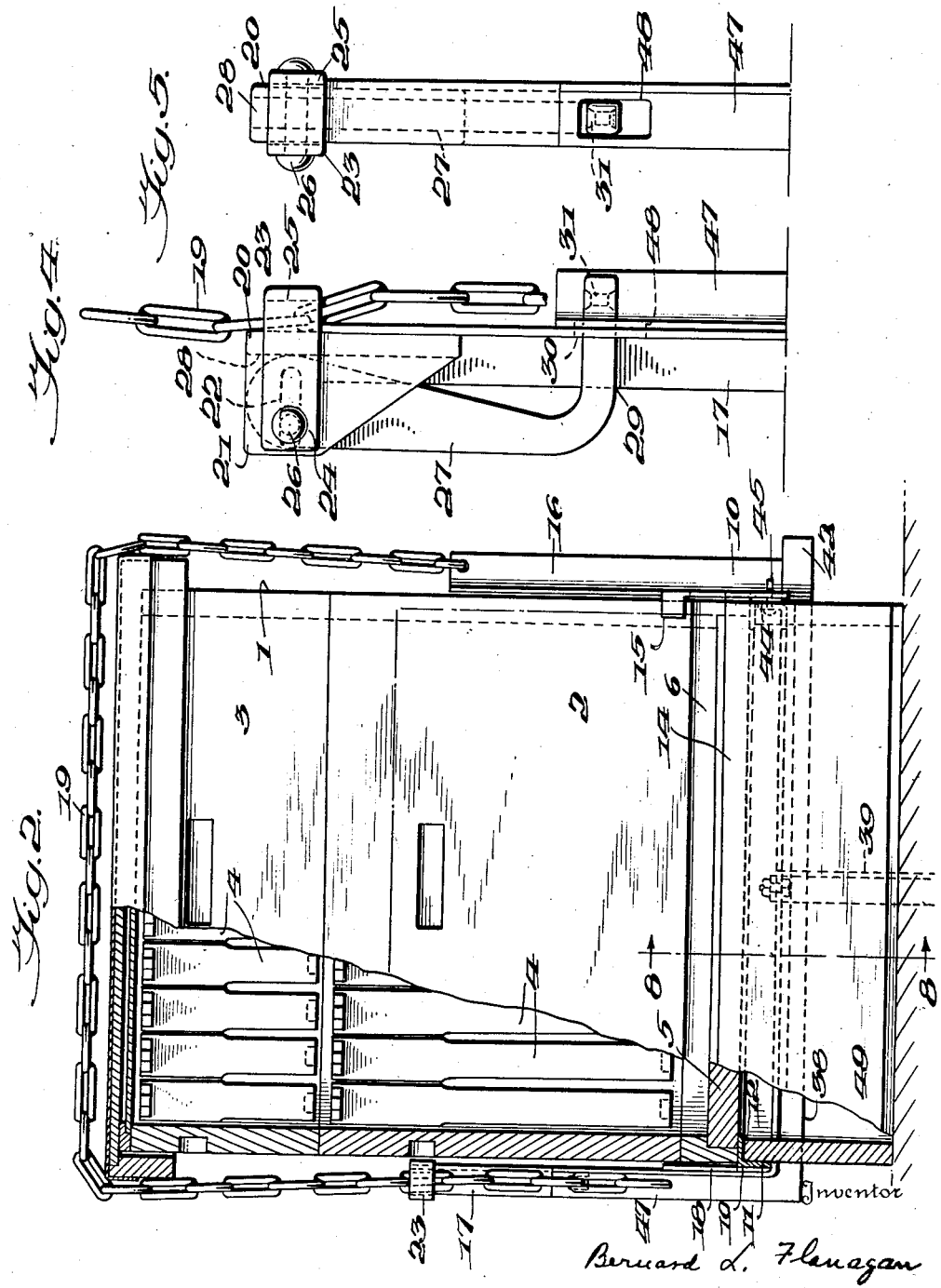

May 16, 1939.　　　B. L. FLANAGAN　　　2,158,067
FASTENING DEVICE FOR BEEHIVES
Filed June 19, 1937　　　3 Sheets-Sheet 3
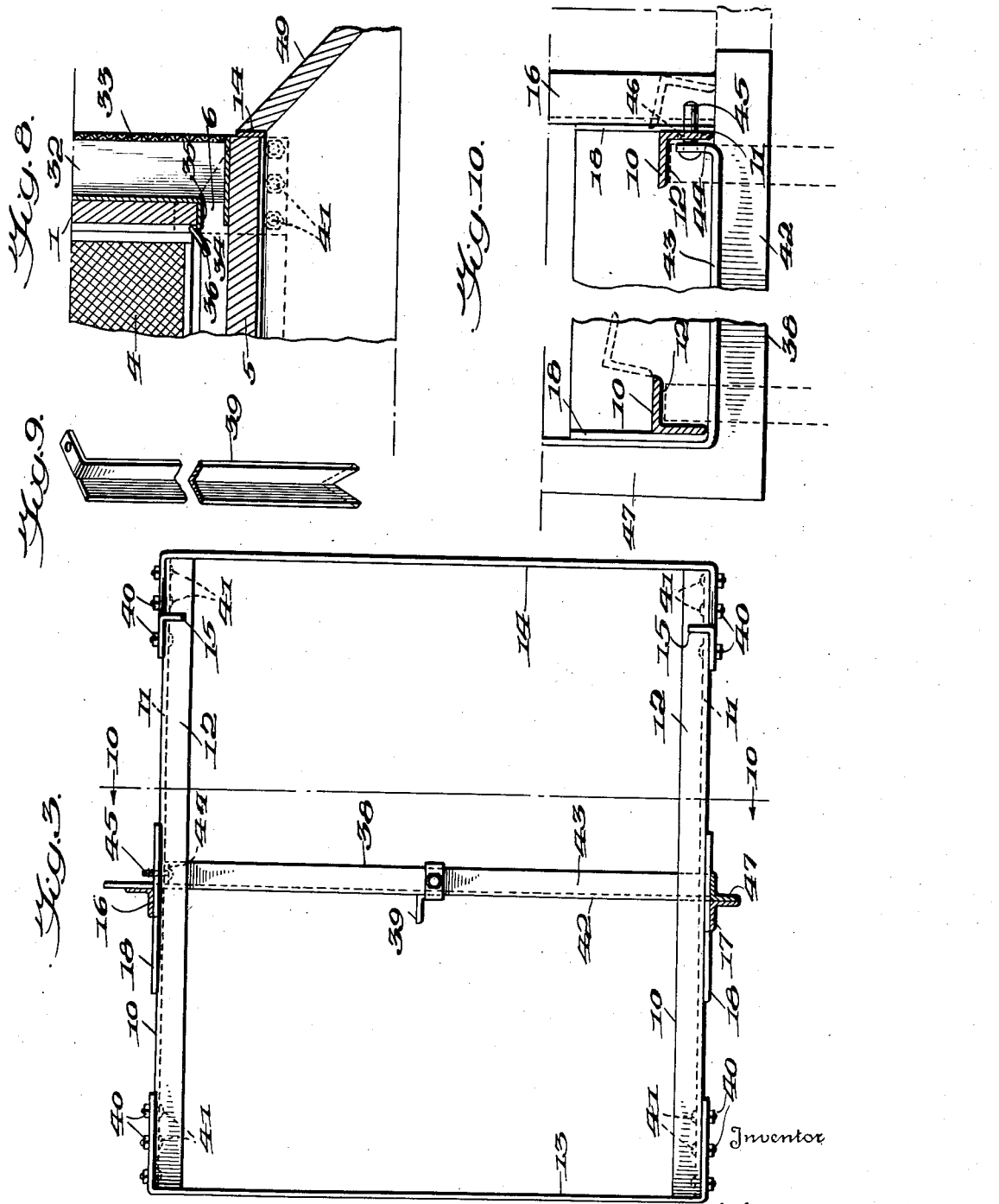

Patented May 16, 1939

2,158,067

UNITED STATES PATENT OFFICE 2,158,067

FASTENING DEVICE FOR BEEHIVES

Bernard L. Flanagan, Wellsville, N. Y., assignor to Flanagan Supply Company, a partnership composed of Clarence J. Flanagan, Huntington Park, Calif., and Bernard L. Flanagan, Wellsville, N. Y.

Application June 19, 1937, Serial No. 149,222

9 Claims. (Cl. 6—12)

My invention relates to beehives and it has for its principal objects the provision of a frame or rack for beehives to facilitate easy moving of the bees from one location to another and for locking or anchoring the beehive in a desired location to eliminate pilferage.

One of the primary features of the invention consists in providing a frame for the beehive having portions disposed on opposite sides of the latter, one of which is provided with flexible means, such as a chain, which is adapted to pass over the beehive and be secured to the other portion of the frame for fastening the hive to the frame.

Another feature of the invention consists in providing the frame with means whereby it may be firmly locked to an anchorage.

A further feature of the invention consists in providing the frame with mechanism which serves the dual function of securing the chain or the like by which the beehive is secured to the frame and of securing the frame to an anchorage.

Other features of the invention, residing in advantageous forms, combinations and relations of parts, will hereinafter appear and be pointed out in the claims.

In the drawings, illustrating a preferred embodiment of the invention,

Figure 1 is a side elevational view of a beehive and associated parts, portions of the hive being shown in section.

Figure 2 is a front elevational view of the construction illustrated in Figure 1, portions of the hive being shown in section.

Figure 3 is a plan view of the frame for the beehive.

Figure 4 is a side elevational view illustrating in operative position the chain securing and the locking mechanism.

Figure 5 is a front elevational view of the mechanism illustrated in Figure 4, the chain being omitted.

Figure 6 is a side elevational view illustrating in inoperative or open position the chain securing mechanism.

Figure 7 is a detail sectional view taken on line 7—7 of Figure 6.

Figure 8 is a detail sectional view taken on line 8—8 of Figure 2.

Figure 9 is a perspective view of one of the elements of the anchorage.

Figure 10 is an enlarged detail sectional view taken on line 10—10 of Figure 3, showing in dotted lines the tilted position the frame must assume to be connected with or disconnected from the anchorage.

Referring more particularly to the drawings, 1 indicates the beehive which is shown as comprising two superimposed chambers, the lower or brood chamber being designated by the reference numeral 2 and the upper or food chamber, sometimes used as a super, being designated by the numeral 3. The hive chambers are provided with a plurality of frames 4 and, except as will hereinafter appear, the hive as a whole is of usual construction having a bottom board 5 which defines with the front wall of the hive an entrance 6; a top outer cover 7 having a sheet metal or other suitable covering 8; and an inner cover 9 which also serves as a bee escape board when removing honey from supers.

The frame for the hive includes two longitudinally extending members 10 which are spaced apart a distance approximately equal to the width of the hive and on which the hive rests. Members 10 may advantageously be of angle shape having vertically disposed flanges 11 and horizontally disposed flanges 12 projecting inwardly from the upper ends of the vertical flanges. At their inner ends, the members 10 are rigidly connected by a back tie strap 13 which extends upwardly above members 10 so as to overlap the outer faces of adjoining portions of the back and sides of the beehive. At their outer ends, members 10 are connected by a front tie strap 14 which is disposed so as to overlap the outer edge of the bottom board 5. The end portions of the front tie strap extend upwardly in overlapping relation to adjacent portions of the sides of the hive and at their upper ends they are respectively formed with inwardly projecting lugs 15 which overlap the front of the hive adjacent its lower corners above the entrance 6. Although the tie straps may be secured to the members 10 in any suitable manner, it is preferred to employ means of such character that they may be readily applied by any one and yet are not accessible from the outside of the frame. To this end, nuts 40 are welded to the outer faces of the end portions of the tie straps to receive machine screws 41 passing through openings in members 10 and the tie straps registering with the openings in the nuts, the machine screws having slotted heads disposed on the inner sides of members 10.

Intermediate their ends, members 10 of the frame are rigidly provided with upwardly extending arms or portions 16 and 17 respectively disposed on opposite sides of the beehive. The lower ends of the arms may be connected to members 10 in any suitable manner, such as by welding, and gussets 18 may be employed to obtain a most rigid connection. The upper end of arm 16 is provided with a chain or other flexible means 19 which is adapted to pass over the top of the hive and thence downwardly to adjacent the arm 17 which is provided with mechanism for firmly gripping the chain, whereby the hive may be fastened to the frame.

Mechanism with which arm 17 is provided for gripping the chain includes a substantially U-shaped bracket 20 which is rigidly secured to the upper end of the arm and is provided with laterally spaced walls or portions 21 respectively formed with aligned elongated slots 22. Movably connected to bracket 20 and projecting laterally therefrom is a substantially U-shaped member 23 having legs 24 and a web 25 defining an opening into which the free end of chain 19 is adapted to be inserted. Member 23 is connected to bracket 20 by a pin 26 which extends through the elongated slots 22 and it may be advantageously supported in a substantially horizontal position by bearing against the upper end of arm 17. To cause member 23 to approach bracket 20 and thus firmly grip the chain, a lever 27 is pivotally mounted on pin 26 intermediate the laterally spaced walls of bracket 20. The pivoted end of the lever is eccentrically curved with respect to the pin 27 and it is adapted to bear against the web 28 of bracket 20 so that upon rotation of the lever in one direction member 23 is caused to grip the chain, and upon rotation of the lever in the opposite direction member 23 will release the chain.

The outer end of lever 27 is offset as indicated at 29 and it is adapted, when member 23 is in chain gripping position, to project through an opening 30 in arm 17. To lock the lever in this position and thus prevent the beehive being removed from the frame, the outer end of the offset portion 29, which projects through opening 30, is provided with an aperture or the like 31 for receiving any suitable means, such, for example, as a padlock (not shown) which would prevent the offset end of the lever being withdrawn from opening 30.

It will thus be perceived that simple and effective means are provided for securing the beehive to a frame enabling the hive to be easily transported from one location to another.

To prevent the bees from escaping from the hive while the latter is in transit, a guard 32 is preferably placed at the entrance 6 of the hive. This guard may be advantageously of box form and, while it may be conveniently made of sheet metal, the front wall thereof is preferably provided with a screen 33. At its lower end, the rear wall of the guard box is provided with an opening which may be approximately coextensive with the hive entrance and, to permit the guard to be easily applied to and removed from the hive, the lower end of the rear wall of the guard is provided with an inwardly projecting portion 34 which is adapted to extend into the hive entrance. This inwardly projecting portion of the guard has a recessed part 35 which is adapted to embrace the lower end portion of the front wall of the hive and it terminates in a downwardly inclined portion 36. When the guard is applied to the hive, the inclined portion 36 engages the lower corner of the front wall of the hive, thus depressing the inwardly projecting portion 34 which will spring upwardly when the recessed part 35 thereof is in position to embracingly engage the lower end of the front wall of the hive and thereby lock the guard in place.

To permit air to freely circulate through the hive, as the bees are being transported from one location to another, a removable screen 37 is preferably used in place of the usual hive covers 7 and 9. It will thus be seen that, in addition to providing a convenient frame for transporting beehives, I have also provided for ample circulation of air through the hive, which is essential during long distance or hot weather moving.

Not only is the frame designed to enable beehives to be conveniently transported from one location to another, but it has also been designed with the view of cooperating in such manner with a suitable anchorage that the hives cannot be removed therefrom by unauthorized persons. The anchorage with which the frame is intended to cooperate comprises a member 38 which is adapted to extend transversely beneath the hive frame and is rigidly secured in any suitable manner to the upper end of an upright post 39 which is firmly embedded in the ground. Member 38 is preferably of angle shape having legs 42 and 43, respectively. At one end of the member, leg 42 projects slightly beyond the frame, while leg 43 terminates in an upwardly extending flange or lug 44 which is adapted to be disposed adjacent the inner face of the adjoining member 10 of the frame. Lug 44 is rigidly provided with a laterally projecting boss or the like 45 which may be conveniently in the form of a bolt or pin which is adapted to extend through an opening 46 in the adjoining member 10 upon sidewise movement of the frame. It will thus be perceived that, after pin 45 has entered opening 46, it will be impossible to raise the frame vertically with respect to the anchorage.

At its opposite end, member 38 is bent upwardly to provide an arm 47 which is adapted to be disposed closely adjacent arm 17 of the frame. Arm 47 is provided with an opening 48 which, when the frame has been properly positioned with respect to the anchorage, registers with opening 30 in arm 17 and is thus adapted to receive the outer end of the offset portion 29 of lever 27. When, therefore, the outer end of the lever has passed through openings 30 and 48 and the padlock or other securing means (not shown) has been inserted in the opening 31 in the outer end of the lever, the frame as well as the beehive are firmly and immovably connected to the anchorage.

If desired, a stand 49 may be provided, in conjunction with the anchorage, for supporting the hive frame. The stand may be conveniently formed of wood and be of generally rectangular shape, although the wall of the stand adjacent the front of the hive may advantageously incline downwardly from adjacent the bottom board 5. The stand is preferably of such size that the horizontal flanges 12 of the frame members 10 will rest upon the upper edges of the side walls of the stand, while the vertical flanges 11 of the frame members and the back tie strap 13 will depend downwardly over the outer faces of the stand.

To remove the hive and its frame from the anchorage, it is first necessary to remove the padlock (not shown) from the outer end of the lever 27. The lever is then rotated sufficiently to cause its offset end to move out of the opening 48 in arm 47 of the anchorage. Movement of the lever only sufficient to accomplish this will not result in member 23 releasing the chain. After the lever has been disengaged from arm 47 of the anchorage and it being temporarily maintained in a position such that member 23 will still be in gripping engagement with the chain, the frame together with the beehive is tilted, as indicated in dotted lines in Figure 10, to permit the depending leg of the frame member 10 adjacent arm 47 to clear the upper edge of the hive stand. The frame and hive are then shifted sidewise to disengage the frame from pin 45. Upon accomplishing this or at any time after the frame has been moved sufficiently to cause the offset end of lever 27 to be clear of arm 47 of the anchorage, the lever is again rotated to cause its offset end to pass through opening 30 in arm 17 and the padlock is reapplied. The hive and frame are thus in condition to be transported to a new location.

Although I have described the preferred embodiment of the invention, various modifications thereof will suggest themselves to those skilled in the art and I do not wish to be limited to precise details, the scope and extent of my invention being defined in the appended claims.

What I claim is:

1. A beehive locking and anchoring device, said device including a supporting frame for the beehive by which it may be transported from one location to another, said frame having portions adapted to be respectively disposed on opposite sides of the beehive, means adapted to pass over the top of the beehive and to be secured to one of said portions for fastening the beehive to the frame, mechanism mounted on said last named portion of said frame for securing said means thereto, and a ground connected member with which said frame and beehive are adapted to be connected, said mechanism having a movable member provided with a portion cooperable with said ground connected member for removably connecting the beehive and frame to the ground connected member.

2. A locking and anchoring device for a beehive, said device including a supporting frame for the beehive by which it may be transported from one location to another, said frame having arms extending upwardly on opposite sides of the beehive, means secured to one of said arms and adapted to pass over the top of the beehive for connection to the other of said arms for fastening the beehive to the frame, mechanism mounted on said last named arm for connecting said means thereto, and a ground connected member with which said frame and beehive are adapted to be connected, said mechanism having a movable member cooperable with said ground connected member for removably connecting the beehive and frame to the ground connected member.

3. A locking and anchoring device for a beehive, said device including means connected to the ground, a frame having portions disposed adjacent the opposite sides of the beehive, flexible means connected to one of said portions and adapted to be secured to the other of said portions for connecting the beehive to the frame, and mechanism mounted on said last-named portion for securing the flexible means thereto, said ground connected means and said frame having interlocking portions and said mechanism having a movable member adapted to be secured to said ground connected means.

4. A locking and anchoring device for a beehive, said device including a frame having arms adapted to be disposed on opposite sides of the beehive, flexible means connected to one of said arms and adapted to be secured to the other for connecting the beehive to the frame, means connected to the ground affording an anchorage for the frame, said means having an upwardly extending portion disposed adjacent said last-named arm of the frame and also having a portion adapted to have interlocking engagement with the frame, and mechanism mounted on said last-named arm for securing the flexible means thereto, said mechanism having a movable member adapted to be connected to the upwardly extending portion of the ground connected means.

5. A locking and anchoring device for a beehive, said device including a frame having arms adapted to be disposed on opposite sides of the beehive, flexible means connected to one of said arms and adapted to be secured to the other of said arms for connecting the beehive to the frame, a member connected to the ground provided at one end with an upwardly extending portion disposed adjacent said last-named arm and provided adjacent its other end with means having interlocking engagement with the frame, and mechanism mounted on said last-named arm for securing the flexible means thereto, said mechanism having a movable element cooperable with said upwardly extending portion for locking the ground connected member and frame together.

6. In combination with a beehive having a plurality of superimposed chambers, means for securing said chambers together, said means including a frame having arms respectively extending upwardly on opposite sides of the bottom chamber, flexible means connected to one of said arms and adapted to be secured to the other of said arms for connecting the beehive to the frame, and a device mounted on said last-named arm for connecting the flexible means thereto, said device including a movable lever and means operable by the lever adapted to engage any selected portion of the flexible means for immovably clamping the latter with respect to said last named arm, and said lever having a portion adapted to receive means for locking it against movement permitting release of the flexible means.

7. In combination with a beehive having a plurality of superimposed chambers together, means for securing said chambers, said means including a frame having portions disposed on opposite sides of the beehive, flexible means connected to one of said portions and adapted to be secured to the other of said portions for connecting the beehive to the frame, and a device mounted on said last-named portion for securing the flexible means thereto, said device involving a movable member for gripping any selected portion of the flexible means, and a lever for actuating the movable member, said frame being provided with spaced portions between which the outer end of the lever projects when said movable member is in gripping relation with the flexible means and said outer end of the lever being formed to receive means for locking the lever to the frame.

8. In combination with a beehive having a plurality of superimposed chambers, means for securing said chambers together, said means including a frame having portions disposed on opposite sides of the beehive, flexible means connected to one of said portions and adapted to be secured to the other of said portions for connecting the beehive to the frame, and a device mounted on said last-named portion for securing the flexible means thereto, said device involving a bracket having a slot, a member movable transversely of the bracket adapted to grip the flexible means, said member having a pin disposed within said slot, and a lever pivotally mounted on said pin for actuating said member.

9. In combination with a beehive having a plurality of superimposed chambers, means for securing said chambers together, said means including a frame disposed beneath the bottom chamber, arms rigid with said frame and respectively projecting upwardly therefrom on opposite sides of the bottom chamber, a chain connected to one of said arms adapted to pass over the top of the uppermost chamber and be secured to the other of said arms, and a device mounted on said last-mentioned arm for securing the chain thereto, said device involving a bracket carried by said arm, a substantially U-shaped member movably mounted on said bracket and forming therewith a passage through which said chain is adapted to extend, and a lever for moving said member toward the bracket to constrict said passage and thereby firmly grip said chain.

BERNARD L. FLANAGAN.